United States Patent [19]

Clumpner

[11] 4,392,636

[45] Jul. 12, 1983

[54] APPARATUS FOR DEGASSING MOLTEN METAL

[75] Inventor: Joseph A. Clumpner, St. Louis, Mo.

[73] Assignee: Swiss Aluminium Ltd., Chippis, Switzerland

[21] Appl. No.: 285,759

[22] Filed: Jul. 22, 1981

[51] Int. Cl.³ .............................................. C21C 5/48
[52] U.S. Cl. ...................................... 266/218; 75/49; 266/265
[58] Field of Search .................... 266/218, 265; 75/49, 75/68 R, 93 E

[56] References Cited

U.S. PATENT DOCUMENTS 2,805,147  9/1957  Schreiber .............................. 75/53
4,200,452  4/1980  Savov ................................... 75/49

Primary Examiner—P. D. Rosenberg
Attorney, Agent, or Firm—Bachman and La Pointe

[57] ABSTRACT

A gas injection nozzle design for use in a swirling tank reactor used in the degassing of molten metal with a fluxing gas. The nozzle design eliminates metal leakage from the reactor around the nozzle tip and gas leakage within the fluxing gas delivery line. The nozzle tip is provided with an orifice profile consisting of a straight hole opening of constant diameter or consisting of a converging-diverging profile.

11 Claims, 4 Drawing Figures

APPARATUS FOR DEGASSING MOLTEN METAL

BACKGROUND OF THE INVENTION

The present invention is drawn to an improved gas injection nozzle design for use in a swirling tank reactor used in the degassing of molten metal with a fluxing gas.

An improved method and apparatus for degassing molten metal is disclosed in U.S. Pat. No. 4,177,066 to Joseph A. Clumpner and assigned to the assignee of the instant invention. The disclosure in the aforenoted patent teaches degassing molten metal using an apparatus comprising a swirling tank reactor wherein molten metal is tangentially introduced into the reactor so that the molten metal flows in a swirling rotating fashion as the metal passes from the inlet of the reactor to the outlet thereof. In order to achieve the desired swirling flow of molten metal from the metal inlet to the metal outlet of the reactor, it is required that the metal inlet be positioned with respect to the chamber wall of the reactor in such a manner as to tangentially introduce the liquid into the reactor. In a preferred embodiment, the swirling tank reactor comprises a first elongated substantially cylindrical sidewall portion and a second downwardly converging sidewall portion beneath the first substantially cylindrical wall portion. Fluxing gas inlet nozzles penetrate the converging wall portion at different heights thereof so as to optimize fluxing gas bubble dispersion through the entire melt as it passes from the inlet of the reactor to the outlet thereof. By positioning the nozzles at different heights in the converging wall portion, the fluxing gas nozzles are in turn located at various distances from the center axis of the swirling tank reactor thereby maximizing fluxing gas bubble dispersion. The specific details of the various embodiments of swirling tank reactors and nozzle locations disclosed in U.S. Pat. No. 4,177,066 may readily employ the improved gas injection nozzle design of the present invention and the disclosure of U.S. Pat. No. 4,177,066 is incorporated herein by reference.

While the above-noted swirling tank reactors disclosed in U.S. Pat. No. 4,177,066 are superior to other known prior art inline degassing apparatuses, a number of problems have been encountered with fluxing gas nozzle designs. In particular, metal leakage from the reactor around the nozzle tip has been experienced. In addition, a problem has been encountered with leakage in the fluxing gas delivery line itself. Finally, it has been found that the nozzles tend to break off when they project through the chamber wall and into the tank proper.

Accordingly, it is a primary object of the present invention to provide an improved gas injection nozzle design for delivering a gaseous material which is free of leakage in the gas delivery line.

It is the principal object of the present invention to provide an improved gas injection nozzle design for use in a swirling tank reactor used in the degassing of molten metal with a fluxing gas.

It is a particular object of the present invention to provide an improved gas injection nozzle design for use in a swirling tank reactor used in the degassing of molten metal wherein leakage from the reactor around the nozzle tip is prohibited.

It is still a further object of the present invention to provide an improved gas injection nozzle design provided with the improvements as aforesaid which is convenient and inexpensive to utilize.

Further objects and advantages of the present invention will appear hereinbelow.

SUMMARY OF THE INVENTION

In accordance with the present invention the foregoing objects and advantages are readily obtained.

The present invention comprises an improved gas injection nozzle design for use in a swirling tank reactor used in the degassing of molten metal with a fluxing gas. The fluxing gas nozzle design comprises a nozzle insert secured in the wall of the swirling tank reactor and flush with the inner circumference of said wall. The nozzle insert is provided with a seating surface adapted to receive a nozzle tip cone made of a ceramic material or the like. The fluxing gas nozzle is spring biased against the nozzle tip cone with adequate force to seal the nozzle against the tip cone and the tip cone against the nozzle insert so as to prevent metal leakage from the reactor around the fluxing gas nozzle. The fluxing gas nozzle is secured to the fluxing gas supply line by means of a nozzle screw assembly employing a seal between the nozzle screw assembly and the fluxing gas nozzle for insuring a gas tight assembly. By mounting the fluxing gas nozzle in substantially flush relationship with the inner circumferential wall of the swirling tank reactor damage to the fluxing gas nozzle due to metal impact or cleaning tool impact is avoided.

In accordance with a preferred embodiment of the present invention the fluxing gas nozzle assembly of the present invention is removably mounted in a mounting structure rigidly secured to the outer circumferential wall of the swirling tank reactor. The mounting is such that the nozzle assembly may be readily removed and replaced in the event of clogging of the nozzle tip or deterioration of the nozzle tip cone or the like.

The apparatus of the present invention eliminates metal leakage from the reactor around the nozzle tip, prevents gas leakage in the fluxing gas delivery line and allows for easy replacement of the nozzle in the event of clogging or the like.

DETAILED DESCRIPTION

Figure 1:
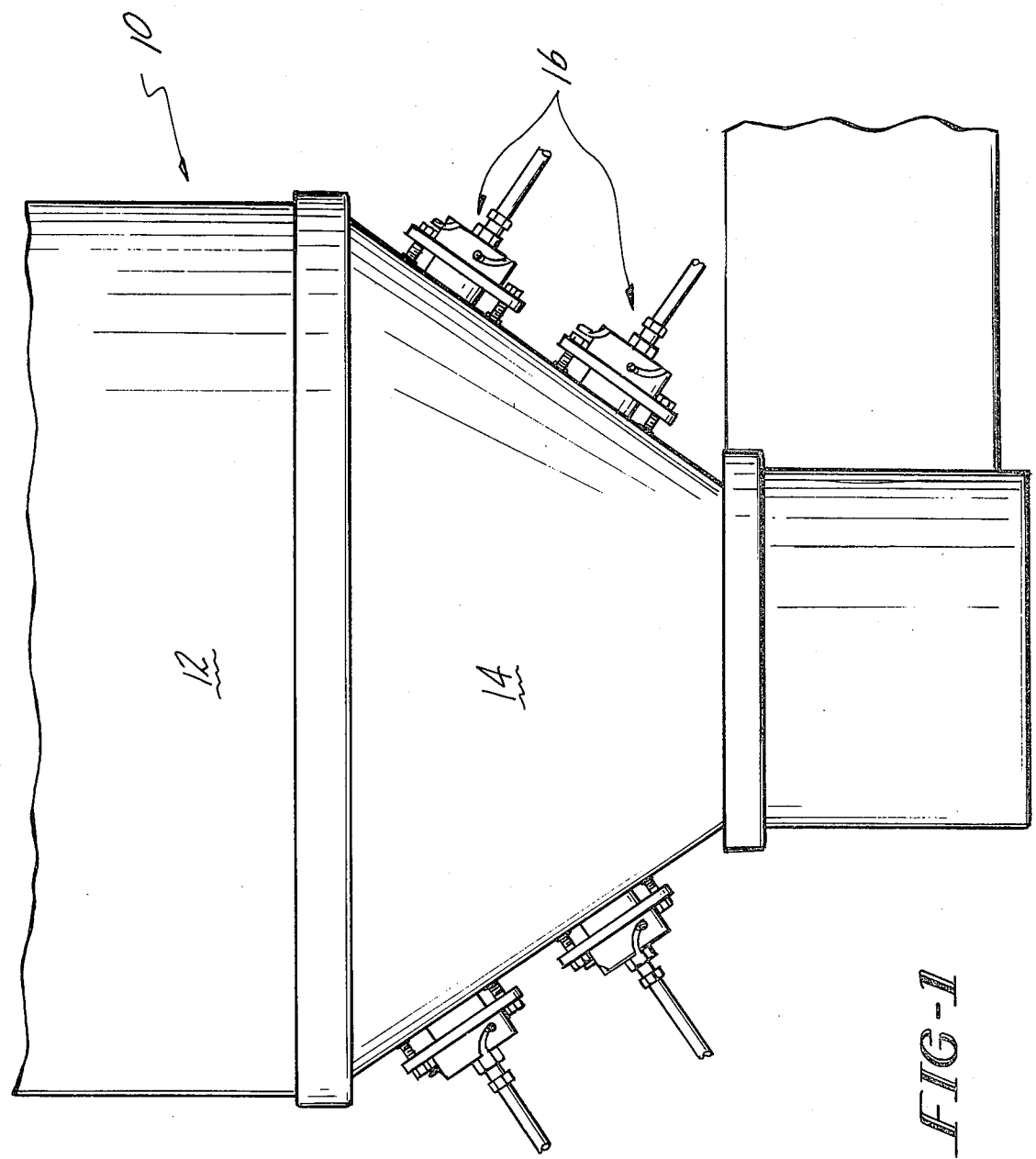
FIG. 1 is a schematic view of a preferred embodiment of a swirling tank reactor as disclosed in U.S. Pat. No. 4,177,066 employing the improved gas injection nozzle design of the present invention.

Referring to FIG. 1, the fluxing gas nozzle design is illustrated in location in a preferred embodiment of a swirling tank reactor 10 comprising a first substantially cylindrical sidewall portion 12 and a second downwardly converging sidewall portion 14 beneath cylindrical sidewall portion 12. As previously noted, the fluxing gas nozzle design of the present invention may be incorporated for use with any of the swirling tank reactors disclosed in U.S. Pat. No. 4,177,066 and the particular details of the designs of said swirling tank reactors are incorporated herein by reference.

Figure 3:
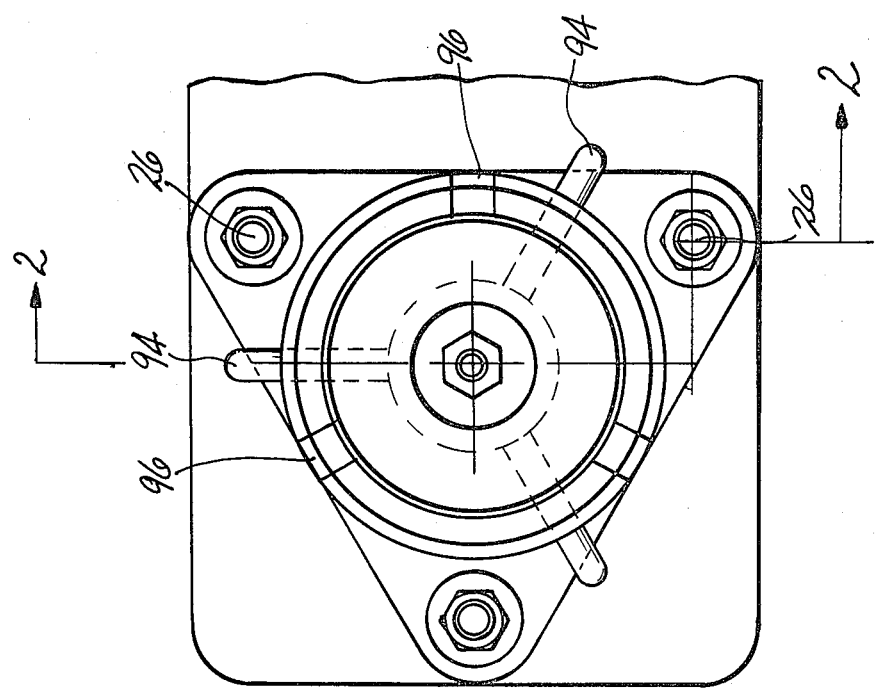
FIG. 3 is a front view of the gas injection nozzle mounting device secured to the body of the swirling tank reactor.
Figure 2:
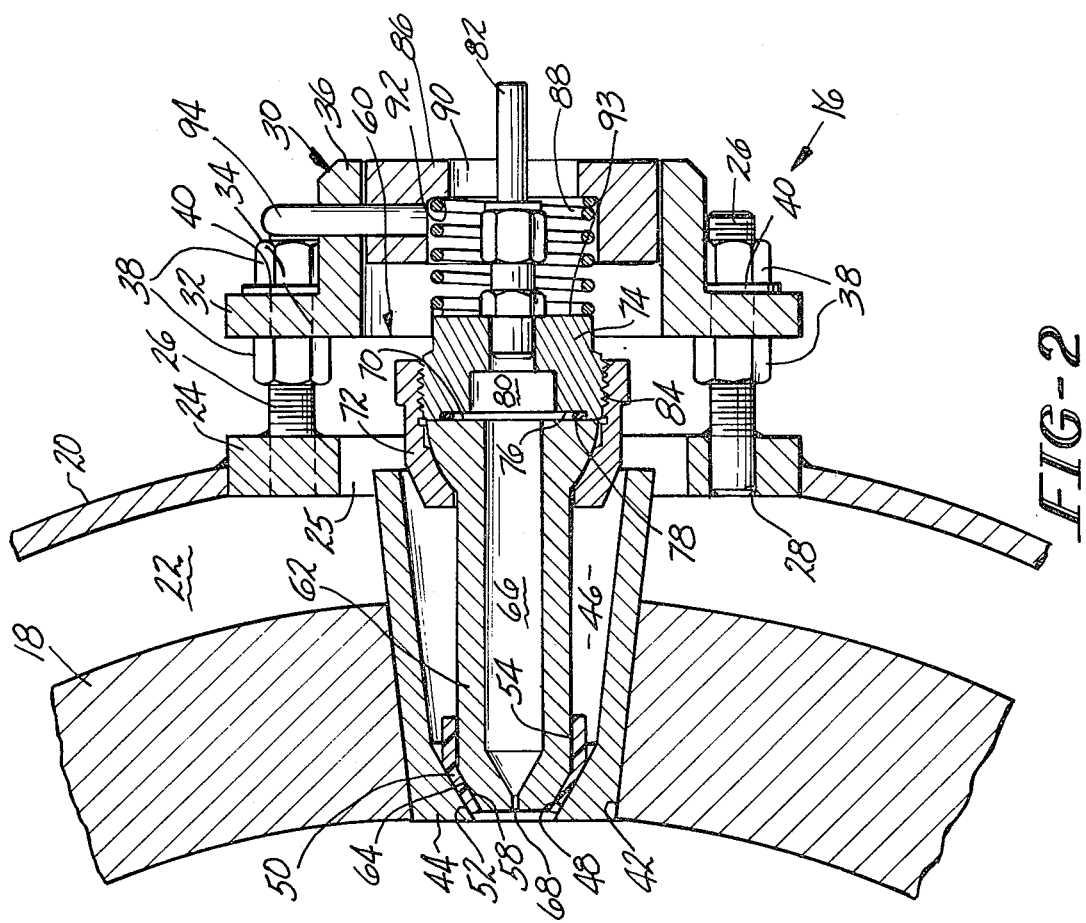
FIG. 2 is a schematic sectional view of the gas injection nozzle design of the present invention taken along the line II—II of FIG. 3.
Figure 4:
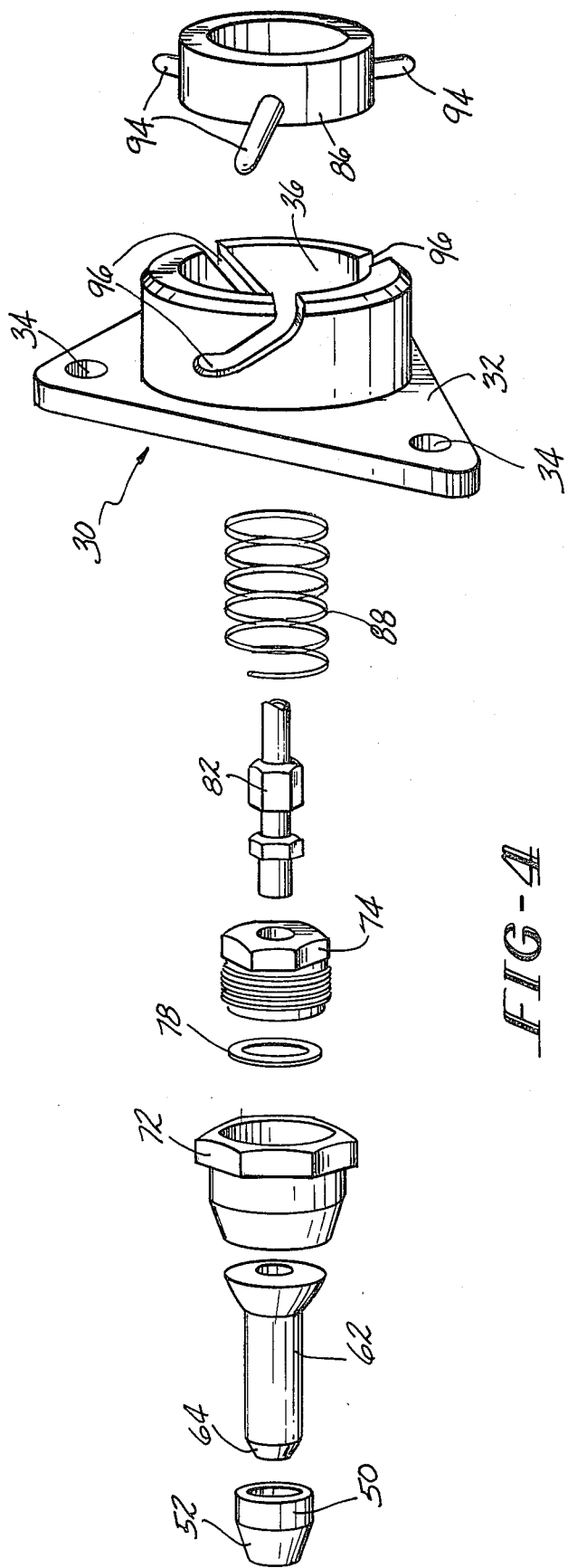
FIG. 4 is an exploded perspective view of the components of the gas injection nozzle design in accordance with the present invention.

A plurality of gas injection nozzle assemblies are secured in the converging sidewall portion 14 by means of mounting frame 16. With particular reference to FIGS. 2-4, the details of the gas injection nozzle design and mounting frame will be described in detail.

With particular reference to FIG. 2, the converging sidewall portion 14 of the swirling tank reactor comprises a first inner wall 18 made of a suitable refractory material and a second outer wall 20, preferably made of steel, spaced from inner wall 18. The space 22 between inner wall 18 and outer wall 20 is preferably packed with a suitable insulating material.

The outer wall 20 is provided with a plurality of flange plates 24, the number of which corresponds to the number of nozzles employed in the swirling tank reactor. The flange plates 24 are provided with a hole 25 for mounting a nozzle assembly and may be formed integrally with wall 20 or may be formed separately from wall 20 and secured in place in an appropriate cut-out in wall 20 by means of welding or the like. The flange plates 24 are each provided with a plurality of threaded stud members 26 which are secured in holes 28 provided in the flange plates 24 by means of welding or the like. As noted above, a plurality of fluxing gas nozzle assemblies are provided in the swirling tank reactor. Each of said nozzle assemblies are mounted by means of an outer ring member 30 having a flange portion 32 and an upstanding portion 36, the flange portion 32 is provided with a plurality of holes 34 for securing the outer ring member 30 to the threaded studs 26. The outer ring member 30 is selectively positioned with respect to each flange plate 24 on threaded studs 28 by means of nuts 38 and lock washers 40 for controlling the biasing pressure on the nozzle assembly as will be discussed in more detail hereinbelow.

The inner wall 18 is provided with a plurality of port holes 42 in alignment with and corresponding in number to the holes 25 in flange plates 24. Mounted in each of the port holes 42 is a nozzle insert 44 having a through hole 46 and a tapered seating surface 48. The nozzle inserts are secured in place in the port holes 42 of the inner walls 18 by means of cement and are made of a suitable refractory material such as silicon carbide or the like. Mounted in the through hole 46 of the nozzle insert 44 is a nozzle tip cone 50 having a bevelled surface 52 adapted to sealingly mate with the seating surface 48 of the nozzle insert 44. The nozzle tip cone 50 is preferably formed of a vacuum formed FIBERFRAX material (FIBERFRAX is a trademark of Harbison-Carborundum Corp. for ceramic fiber made from alumina and silica) which, under compression forces, readily seals the bevelled surface 52 of the nozzle tip cone 50 on the sealing surface 48 of nozzle insert 44. Like the nozzle insert 44, the nozzle tip cone 50 is provided with a through hole 54 having a sealing surface 58 adapted to receive in a sealing fashion the bevelled surface 64 of nozzle blank 62 of nozzle assembly 60.

Nozzle assembly 60 comprises a nozzle blank 62 having a passage 66 and an orifice profile 68 downstream of passage 66. Mounted on the back surface 70 of nozzle blank 62 by means of nozzle nut 72 is a screw assembly 74 having an undercut portion 76 receiving a seal 78 adapted to mate with the back surface 70 of the nozzle blank 62 in a gas tight manner. Screw assembly 74 is provided with a through passage 80 which receives a gas supply tube 82 which is secured to the screw assembly 74 by welding or the like. The screw assembly 74 is provided with external threads 84 for receiving the nozzle nut 72 for securing the screw assembly 74 in a sealing relationship via seal 78 to the back surface 70 of the nozzle blank 62. The seal 78 may be a metal seal but is preferably a metal impregnated graphite gasket type seal.

The nozzle assembly is mounted in the through hole 54 of nozzle tip cone 50 such that the bevelled surface 64 of the nozzle blank 62 mates with the sealing surface 58 of the nozzle tip cone 50 by means of inner ring 86 and nozzle compression spring 88. Inner ring 86 is provided with a through hole 90 having an undercut portion 92 adapted to receive one side of nozzle compression spring 88 whose other side is adapted to abut the rear wall 93 of screw assembly 74. Inner ring 86 is provided with a plurality of arms 94 secured thereto which are adapted to be securely received in slots 96 provided in the upstanding portion 36 of outer ring member 30. When the arms 94 on inner ring 86 are received in slots 96 on outer ring member 30, nozzle compression spring 88 abutting the undercut surface 92 of through hole 90 in inner ring 86 acts against the back wall 93 of screw assembly 74 for biasing the nozzle assembly and particularly the bevelled surface 64 of nozzle blank 62 in sealing relationship with the sealing surface on nozzle tip cone 50. The compression force provided by spring 88 on the nozzle assembly 60 may be adjusted by varying the position of the outer ring member 30 with respect to the flange plate 24 by positioning the outer ring member 30 at various positions on the threaded studs 66 by means of the nuts 38 and lock washers 40. By providing a nozzle assembly and mounting frame as outlined above leakage of molten metal from the reactor around the nozzle blank 62 is eliminated. In addition, the provision of the nozzle screw assembly 74, nozzle nut 72, seal 78 and nozzle blank 62 prevents gas leakage in the fluxing gas delivery line. Finally, as the nozzle blanks do not penetrate into the interior of the swirling tank reactor damage to the nozzle blanks by the force of the molten metal and by cleaning the inside walls of the reactor is eliminated.

As previously noted, the orifice profile 68 of the nozzle blank 62 may consist of either a straight hole opening of constant diameter or of a converging-diverging profile. In accordance with the present invention, the diameter of the straight hole portion should be made as small as possible consistent with preventing plugging of the orifice profile with molten metal. In accordance with the present invention, the orifice size may range from 0.005" to 0.075" and preferably from 0.010" to 0.05". In the event a converging-diverging profile is employed, it is preferred that the converging portion form with the axis of the nozzle an angle of from about 10° to 60° and preferably 20° to 40°. The diverging portion should form with the axis of the nozzle an angle of from about 1° to 8° and preferably 2° to 4°. The transition between converging and diverging sections must be a smooth surface without any abrupt changes in angle.

It has been found that by employing the gas injection nozzle design of the present invention metal and gas leakage is eliminated and nozzle life is greatly increased. Furthermore, the nozzles are mounted so as to enable the same to be readily adjusted and replaced if necessary.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An apparatus for use in the degassing of molten metal which comprises:
   a chamber having an inner elongated sidewall portion, an outer elongated sidewall portion and a central axis;
   metal inlet means positioned at a first height and tangentially located with respect to said chamber for tangentially introducing molten metal into said chamber such that said molten metal swirlingly flows from said molten metal inlet down through said chamber;
   metal outlet means positioned at a second height below said first height for removing molten metal from said chamber; and
   at least two fluxing gas inlet means mounted in said first inner elongated sidewall portion below said first height at different radial distances from said central axis of said chamber for introducing fluxing gas into said chamber.

2. An apparatus according to claim 1 wherein said at least two fluxing gas inlet means are mounted substantially flush with the inner surface of said first inner elongated sidewall portion.

3. An apparatus according to claim 1 wherein each of said at least two fluxing gas inlet means comprises a nozzle assembly sealingly mounted within an opening provided in said first inner elongated sidewall portion.

4. An apparatus according to claim 3 wherein means are provided on said second outer elongated sidewall portion for biasing said nozzle assembly in a sealing fashion within said opening.

5. An apparatus according to claim 3 wherein an insert is provided in said opening in said first inner elongated sidewall portion, said insert being provided with a surface for receiving said nozzle assembly so as to form a seal between said nozzle assembly and said nozzle insert.

6. An apparatus according to claim 5 wherein means are provided on said second outer elongated sidewall portion for biasing said nozzle assembly against said nozzle insert.

7. An apparatus according to claim 6 wherein a nozzle tip cone is provided between said seat on said insert and said nozzle assembly.

8. An apparatus according to claim 3 wherein said nozzle assembly comprises a nozzle blank having an orifice profile, a screw assembly having an undercut portion, a seal provided in said undercut portion of said screw assembly and a nut wherein said undercut portion of said screw assembly abuts the nozzle blank in sealing relationship therewith and is secured to said nozzle blank by said nut.

9. An apparatus according to claim 6 wherein said means for biasing comprises an outer ring selectively positioned with respect to said second outer elongated sidewall portion, an inner ring removably secured to said outer ring, said inner ring having spring means associated therewith for abutting said nozzle assembly so as to bias said nozzle assembly in a sealing fashion.

10. An apparatus according to claim 9 wherein said outer ring is selectively mounted on a plurality of studs protruding from said second outer elongated sidewall portion for adjusting the biasing force of said spring on said nozzle assembly.

11. A nozzle assembly comprising a nozzle blank, a screw assembly having an undercut portion, a seal provided in said undercut portion of said screw assembly and a nut wherein said undercut portion of said screw assembly abuts the nozzle blank in sealing relationship therewith and is secured to said nozzle blank by said nut.

* * * * *